US006446659B2

(12) United States Patent
Schroeder

(10) Patent No.: US 6,446,659 B2
(45) Date of Patent: Sep. 10, 2002

(54) ASEPTIC PRODUCT DISPENSING SYSTEM

(75) Inventor: Alfred A. Schroeder, San Antonio, TX (US)

(73) Assignee: Lancer Partnership, San Antonio, TX (US)

( * ) Notice: Subject to any disclaimer, the term of this patent is extended or adjusted under 35 U.S.C. 154(b) by 0 days.

(21) Appl. No.: 09/835,965

(22) Filed: Apr. 16, 2001

Related U.S. Application Data

(63) Continuation of application No. 09/637,232, filed on Aug. 11, 2000, now Pat. No. 6,240,952.

(60) Provisional application No. 60/148,468, filed on Aug. 12, 1999.

(51) Int. Cl.[7] .......... B08B 9/00; F16K 51/00

(52) U.S. Cl. .......... 137/240; 134/95.1; 134/169 R

(58) Field of Search .......... 137/240; 134/95.1, 134/166 R, 169 R, 95.2, 95.3, 98.1

(56) References Cited

U.S. PATENT DOCUMENTS

| | | | | | |
|---|---|---|---|---|---|
| 4,653,526 | A | * | 3/1987 | Hoiss | 137/240 |
| 4,676,279 | A | * | 6/1987 | von Lersner | 137/240 X |
| 4,979,527 | A | * | 12/1990 | Mueller et al. | 137/240 X |
| 5,746,239 | A | * | 5/1998 | Ondrus | 137/240 X |
| 5,749,494 | A | * | 5/1998 | Wolski et al. | 137/240 X |
| 5,968,285 | A | * | 10/1999 | Ferrell et al. | 134/95.3 X |

* cited by examiner

*Primary Examiner*—Philip R. Coe
(74) *Attorney, Agent, or Firm*—Christopher L. Makay

(57) ABSTRACT

An aseptic product dispensing system generally includes a sanitary connection assembly interposed in fluid communication with a substantially conventional aseptic product source and a substantially conventional product dispenser. The sanitary connection assembly is provided with an automated cleaning system whereby a combination of pressurized gas, flushing fluid and/or sanitizing solution may be injected into, and thereafter evacuated from, the sanitary connection assembly.

31 Claims, 8 Drawing Sheets

ASEPTIC PRODUCT DISPENSING SYSTEM

RELATED APPLICATIONS

This application is a continuation under 35 USC § 120 of U.S. patent application Ser. No. 09/637,232 filed Aug. 11, 2000, and now U.S. Pat. No. 6,240,952, which claims all available benefit under 35 USC § 119(e) of co-pending U.S. provisional patent application Serial No. 60/148,468 filed Aug. 12, 1999. By this reference, the full disclosures of U.S. patent application Ser. No. 09/637,232 and U.S. provisional patent application Serial No. 60/148,468 are incorporated herein as though now set forth in their respective entirety.

FIELD OF THE INVENTION

The present invention relates to food product dispensing equipment and, more particularly, but not by way of limitation to a method and apparatus for the lengthened preservation and safer dispensing of an aseptic food product with minimum introduction of contaminants thereto.

BACKGROUND OF THE INVENTION

As changing consumer lifestyles have increasingly resulted in an emphasis on speed and convenience, food-borne illness of microbial origin has become a most serious food and beverage safety issue. As more consumers rely on manufacturers and food stores for food-safety protection, food and beverage providers must take heightened steps to eliminate those risks most often responsible for foodborne illness. In particular, the food producer, distributor and retailer must work toward the elimination of foodborne hazards resulting from improper holding temperature and post-production contamination, factors that according to the Centers for Disease Control and Prevention were responsible for nearly 80% of outbreaks in a recent survey period.

In the past, food and beverage providers have addressed microbial-related foodborne illness issues through adherence to food safety recommendations based upon temperature and acidity. These guidelines, however, essentially only extend the time required for a risk to become a hazard, in the case of refrigeration, or sidestep the problem by categorizing certain products as too acidic to support microbial activity. Unfortunately, refrigeration only slows microbial activity and recent studies reveal that previously established acidity-based recommendations may not sufficiently eliminate risks from some pathogens.

More recently, food and beverage providers have turned to technological advances in food preparation and handling to address some of the shortcomings of refrigeration and acidity level based approaches. One such advance is the irradiation of low acid type products, such as milk, yogurt and ice cream. In practice, the low acid product is heated or pasteurized, sealed in a sterile package and then treated with a radiation source to result in an entirely aseptic product having a significantly extended shelf life without requirement for refrigeration. Unfortunately, the known aseptic products remain free from contamination only to the time of dispensing, at which point airborne or otherwise introduced microbial agents restart the spoilage process.

As a result of dispensing related contamination, even aseptically produced products require constant refrigeration or rapid turnover once removed from their packaging. In the case of low acid, milk-based products this entails at least daily cleaning and sterilization of the product dispenser—typically at the expense of a significant labor investment. Unfortunately, the investment in labor for the required cleaning operations is not the only disadvantage of known dispensing systems. The labor intensive cleaning operation is also faulted for the human introduction of the very contaminants sought to be avoided. For example, inadequate cleaning of known dispensing systems by exposed persons has been repeatedly linked to outbreaks of human listeriosis, which can cause stillbirths, miscarriages, meningitis, sepsis and the like, especially in elderly or otherwise immunocompromised hosts.

With the shortcomings of the prior art clearly in mind, it is an overriding object of the present invention to improve upon the prior art by providing a dispensing system wherein an aseptic product may be delivered as near as possible to the consumer without introduction of microbial agents, thereby generally increasing the safety of dispensed food and beverage products. It is a further object of the present invention to provide such a system wherein the labor resources required for maintenance are reduced and the opportunity for human introduction of contaminants minimized. It is a still further object of the present invention to provide such a system wherein product waste is minimized, thereby contributing to increased profits without compromise of the provided consumer safety features.

SUMMARY OF THE INVENTION

In accordance with the foregoing objects, the present invention—an aseptic product dispensing system—generally comprises a sanitary connection assembly interposed in fluid communication with a substantially conventional aseptic product source and a substantially conventional product dispenser. According to the preferred embodiment, the sanitary connection assembly is provided with an automated cleaning system whereby a combination of pressurized gas, water and/or sanitizing solution may be injected into, and thereafter evacuated from, the sanitary connection assembly.

A first portion of the sanitary connection assembly remains in fixed fluid communication with the product dispenser while a second portion of the sanitary connection assembly, which may be selectively isolated from the first portion according to the actuation of an interposed valve, is releasably connected to the aseptic product source. According to the preferred method of the present invention, the aseptic product source is connected to the second portion of the sanitary connection assembly while the interposed valve is closed to isolate the first portion of the sanitary connection assembly. Once the aseptic product source is connected, the second portion of the sanitary connection assembly is flushed with the automated cleaning system, whereafter the interposed valve may be opened to allow the sanitary communication of aseptic product into the product dispenser.

The automated cleaning system of the aseptic product dispensing system generally includes a source of pressurized sanitizing solution, a source of pressurized flushing fluid and a source of pressurized gas, each in selective fluid communication with the flushing inlet of the sanitary connection assembly through interposed flow-control valves. An integrated microprocessor based controller of conventional implementation is provided for operative control of the valves of the sanitary connection assembly and automated cleaning system. This controller generally interfaces with a plurality of sensors or transducers and a plurality of valve controllers to detect the presence or absence of product in the various stages of the dispensing system and to monitor the valve positions and component connections. The controller then controls the valve positions and fluid flows in response to the sensed or monitored inputs.

Finally, many other features, objects and advantages of the present invention will be apparent to those of ordinary skill in the relevant arts, especially in light of the foregoing discussions and the following drawings and exemplary detailed description and the claims drawn thereto.

BRIEF DESCRIPTION OF THE DRAWINGS

Although the scope of the present invention is much broader than any particular embodiment, a detailed description of the preferred embodiment follows together with illustrative figures, wherein like reference numerals refer to like components, and wherein.

DETAILED DESCRIPTION OF THE PREFERRED EMBODIMENT

Although those of ordinary skill in the art will readily recognize many alternative embodiments, especially in light of the illustrations provided herein, this detailed description is exemplary of the preferred embodiment of the present invention, the scope of which is limited only by the claims drawn hereto.

Figure 1:
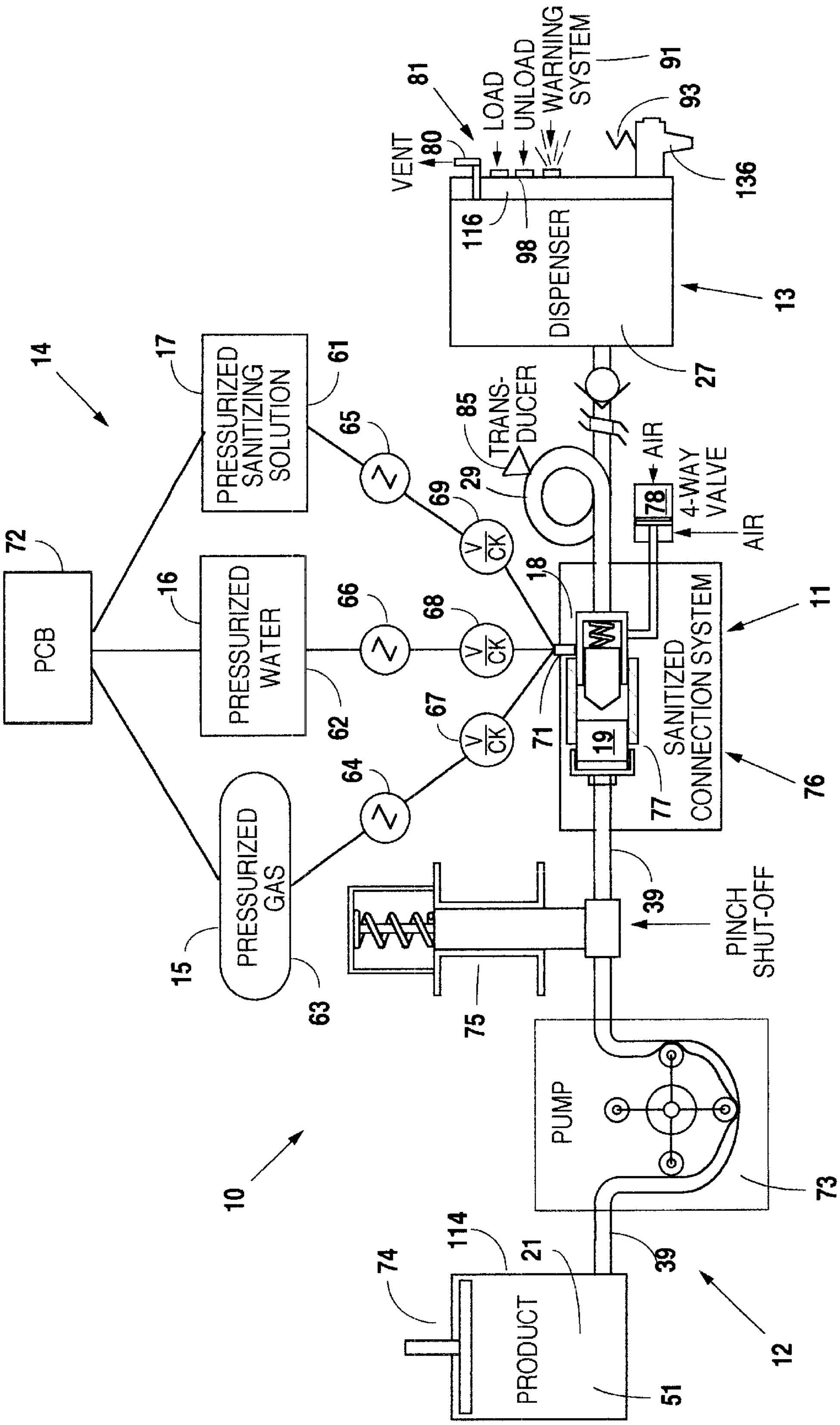
FIG. 1 shows, in schematic block diagram, the preferred embodiment of the aseptic product dispensing system of the present invention.
Figure 2:
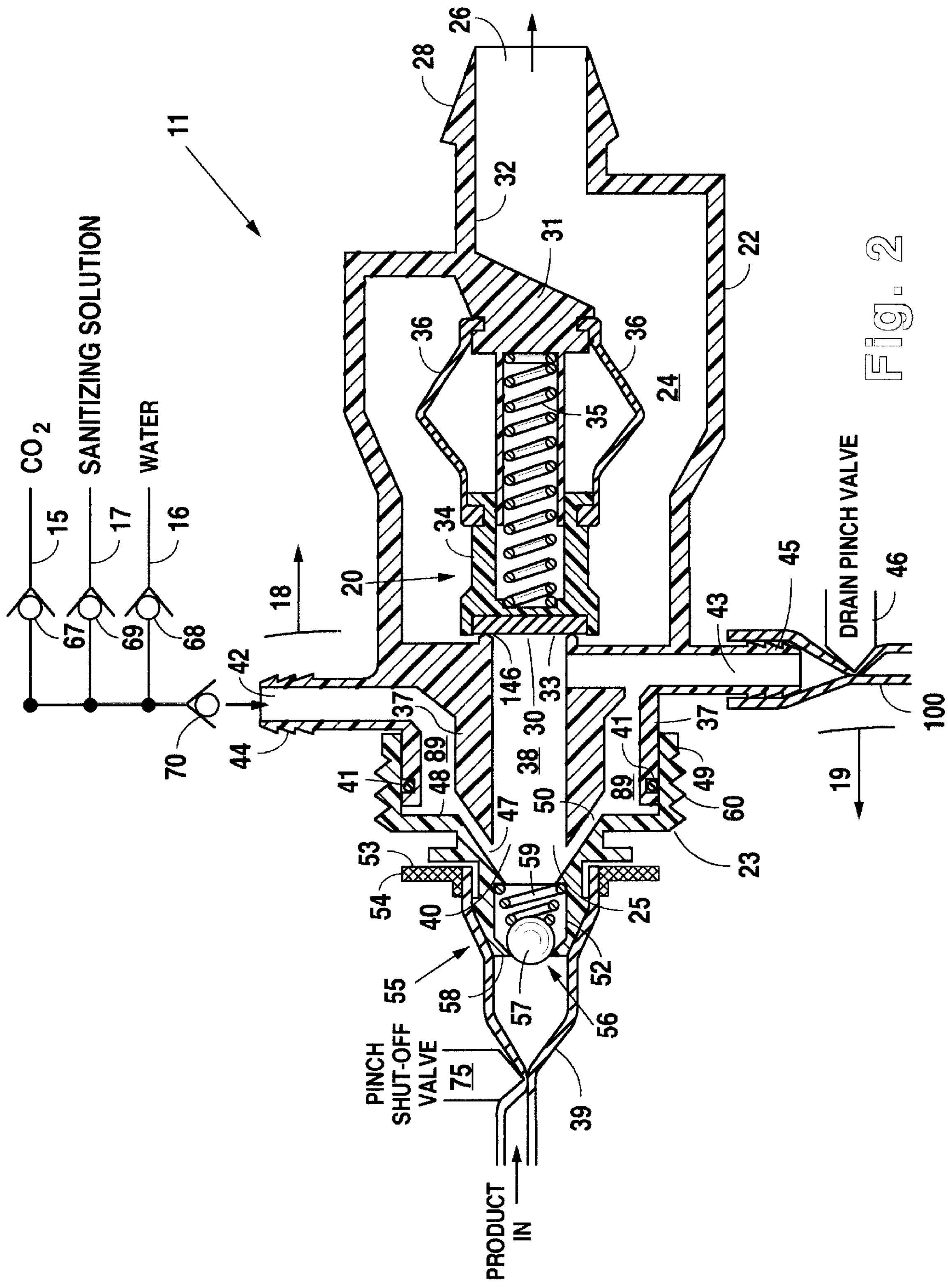
FIG. 2 shows, in schematic block diagram, the sanitary connection assembly and automated cleaning system of the aseptic product dispensing system of FIG. 1.

Referring generally to the Figures and, in particular, to FIGS. 1 and 2, the aseptic product dispensing system 10 is shown to generally include a sanitary connection assembly 11 interposed in fluid communication with a substantially conventional aseptic product source 12 and a substantially conventional product dispenser 13. According to the preferred embodiment of the aseptic product dispensing system 10, the sanitary connection assembly 11 is provided with an automated cleaning system 14 whereby a combination of pressurized gas 15, flushing fluid 16, such as for example water, and/or sanitizing solution 17 may be injected into, and thereafter evacuated from, the sanitary connection assembly 11.

In the preferred embodiment of the aseptic product dispensing system 10, a first portion 18 of the sanitary connection assembly 11 remains in fixed fluid communication with the product dispenser 13. A second portion 19 of the sanitary connection assembly 11, which may be selectively isolated from the first portion 18 according to the actuation of an interposed valve 20, is releasably connected to the aseptic product source 12. According to the preferred method, the aseptic product source 12 is connected to the second portion 19 of the sanitary connection assembly 11 while the interposed valve 20 is closed to isolate the first portion 18 of the sanitary connection assembly 11. Once the aseptic product source 12 is connected, the second portion 19 of the sanitary connection assembly 11 is flushed with the automated cleaning system 14, whereafter the interposed valve 20 may be opened to allow the sanitary communication of aseptic product 21 into the product dispenser 13. These and other aspects of the present invention 10 will be more fully understood after detailed description of each of the foregoing components and steps, which now follows.

Referring now to FIG. 2 in particular, the preferred embodiment of the sanitary connection assembly 11 is detailed. In general, the sanitary connection assembly 11 comprises a cavernous body 22 and a hose connector 23, which together define a first cavity portion 24 and a second cavity portion 25. The body 22 may be constructed of any suitable material as now utilized in the manufacture of food product dispensing items, such as hardened plastic or stainless steel. Although a unitary construction is preferred for simplification of the assembly process, those of ordinary skill in the art will recognize that many other substantially equivalent structures may be substituted. Finally, the body 22 is preferably of a substantially cylindrical shape for simplification of the interface with the hose connector 23. Those of ordinary skill in the art, however, will recognize that other general forms may be substituted within the spirit of the invention with only corresponding loss of the connection advantages.

As also shown in FIG. 2, the cavernous body 22 defines a first cavity portion 24 for the passage of product 21 en route the product dispenser 13. This first cavity 24 terminates in a product outlet 26 for connection with, and fluid communication of product 21 to, the product dispenser 13. As shown, the product outlet 26 is preferably barbed 28 to facilitate the secure friction fit attachment of a tube or hose 29 to product dispenser 13 or a freeze chamber 27 therein. Because it is important that the entire system 10 be airtight and contaminant free, hose clamps or luer-type locks may also be utilized at places like the product outlet 26 to further ensure the system's integrity.

The first cavity portion 24 receives product 21 from a second cavity portion 25, detailed further herein, through a product port 30 opposite the product outlet 26. Flow through the product port 30 is regulated by a poppet-type product flow-control valve 20. Although those of ordinary skill in the art will recognize many alternative embodiments, in the preferred embodiment this valve 20 is dependently supported upon a mounting projection 31 extending from the interior wall 32 of the body 22 near the product outlet 26. The valve 20 generally comprises a polymeric gasket 33 supported by a valve carrier 34, biased against and seated over the product port 30 by a biasing spring 35 disposed in the longitudinal axis of the valve's poppet action. Although in the preferred embodiment the valve 20 is actuated upon reaching a predetermined threshold pressure in the second cavity 25, the valve 20 may be actuated by any known means, including a cam mechanism or solenoid. In the case of external activation, however, an electrically controllable means is preferred as will be more apparent further herein. Finally, the biasing spring 35 and any actuation hardware are enclosed in, and protected by, a polymeric boot 36, which may be extended or compressed along the longitudinal axis of the valve 20. These and other aspects of the flow-control valve's operation will be even better understood upon discussion of the present invention's operation, further herein.

The second cavity portion 25 of the sanitary connection assembly 11 is formed through the union of a specially adapted hose connector 23 and a receptacle 37 formed on the end of the cavernous body 22. The receptacle 37 is cylindrically shaped for easy connection of the hose connector 23 as detailed further herein. In the preferred embodiment, the receptacle comprises a central product aperture 38 oriented along the longitudinal axis of the body 22 and directed from the product hose 39, detailed further herein, toward the product port 30 to the first cavity portion 24 and an annular flushing cavity 89 about the central product aperture 38. As will also be better understood further herein, this annular flushing cavity 89 is specifically adapted to facilitate sterilization of the connector assembly 11 after connection of the hose connector 23 and prior to product 21 flow. A cannular projection 40 is provided at the tip of the receptacle 37 for piercing a sanitary protective cover of the hose connector 23 and an O-ring 41 is provided about the circumference of the receptacle 37 to facilitate sealing engagement of the hose connector 23. In this manner, the hose connector 23 may be press fit onto the receptacle 37, with minimum opportunity for human contamination of the interior spaces of the hose connector 23.

Finally, a flushing inlet 42 and a drain port 43 are each provided in fluid communication with the annular flushing cavity 89 and, therethrough, with the central product aperture 38. As with the product outlet 26, the flushing inlet 42 and drain port 43 are preferably provided with exterior barbs 44, 45 and may also be adapted for use with hose clamps or luer-type locks to ensure system integrity. As will be better understood further herein, the flushing inlet 42 is fixedly attached to an automated cleaning system 14, which according to the preferred method of the present invention injects sanitizing solution 17, flushing fluid 16 and/or gas 15 into the sanitary connection assembly 11 for the automated cleaning thereof. The injected cleaning product 15, 16, 17 is then evacuated through the drain port 43, which is provided with a pinch shut-off valve 46 to allow flow therethrough only during the cleaning operation thereby preventing the entry of contaminants.

Still referring to FIG. 2, the hose connector 23 of the sanitary connection assembly 11 is now detailed. As shown in the Figure, the hose connector 23 is preferably shaped for abutting engagement with the receptacle 37 of the cavernous body 22. In particular, the hose connector 23 is provided with a beveled central portion 47 that tapers outwardly to a radial shoulder 48. The beveled central portion 47 thereby encompasses the cannular tip 40 of the receptacle 37. The circular edge 49 of the cap is adapted to fit tightly about the outer surface of the receptacle 37 and to engage the O-ring 41 thereabout in a sealed friction fit. As can be seen in the Figure, the union of the hose connector 23 with the receptacle 37 forms the interior aperture 38 from the product hose 39 to the product port 30, but also leaves a circumferential channel 50 about the exterior of the cannular tip 40 and into the annular flushing cavity 89. As will now be apparent to those of ordinary skill in the art, this channel 50 enables sanitizing of the face of the receptacle 37 after application of the hose connector 23 but prior to product 21 flow.

As also shown in FIG. 2, a product hose 39 from the substantially conventional aseptic product package 51 is fixedly attached to the specially adapted hose connector 23 by friction fit over a barbed projection 52. The product hose 39 is preferably retained securely in place on the hose connector 23 with a ferrule 53, which preferably comprises an outwardly projecting flange 54 for use in securing the hose connector 23 to the receptacle 37 as will be better understood further herein. As will be understood by those of ordinary skill in the art, however, the product hose 39 could be integrally manufactured with the hose connector 23.

A check valve 55 for preventing back flow of product 21 and/or contaminants into the product hose 39 is formed in the connector's aperture 56 by a polymeric ball 57 pressed into a spherical socket 58 by a biasing spring 59. In this manner, product 21 may only flow when forced through the hose 39 to displace the ball 57 against the spring 59 and away from the spherical socket 58. Upon cessation of forced flow, the biasing spring 59 immediately and firmly presses the ball 57 back into the spherical socket 58, preventing any back flow of product 21 and/or contaminants.

To further minimize any chance for the introduction of contaminants into the aseptic product dispensing system 10, the specially adapted hose connector 23 is also preferably provided with exterior threading 60 to allow placement of a cap. Such a cap is utilized to keep the face of the hose connector 23 clean during storage or transportation of the aseptic product source 12 and is preferably only removed just prior to loading of the product 12 into the aseptic product dispensing system 10. In addition, the face of the hose connector 23 is manufactured with a perforable cover, such as those well known for use in safety sealing of commercially available medicines, food products and the like. At the time of product loading, the cannular tip 40 of the receptacle 37 is used to puncture the perforable cover, thereby establishing fluid communication with the interior of the hose connector 23 with absolute minimum human contact.

Referring now to FIGS. 1 and 2 together, the automated cleaning system 14 of the aseptic product dispensing system 10 is shown to generally comprise a source 61 of pressurized sanitizing solution 17, a source 62 of pressurized flushing fluid 16 and a source 63 of pressurized gas 15, each in selective fluid communication with the flushing inlet 42 of the sanitary connection assembly 11 through interposed flow-control valves 64, 65, 66. Each source 61, 62, 63 is further isolated one from another as well as from the connection assembly 11 via a plurality of interposed check valves 67, 68, 69, 70, which may comprise ball valves or any other substantial equivalent as well known in the art. Although in the preferred embodiment the pressurized gas 15 is chosen to be carbon dioxide, those of ordinary skill in the art will recognize that many substantially equivalent gases may be substituted, the primary considerations in the choice being the desirability to use a gas 15 that is generally non-supportive of microbial growth but also not harmful to humans.

In the preferred embodiment of the aseptic product dispensing system 10, the flow-control valves 64, 65, 66 of the automated cleaning system comprise solenoid valves, which are easy to control in an automated system. Those of ordinary skill in the art, however, will recognize that other types of valves may be equivalently substituted with only corresponding sacrifice in controllability while remaining well within the scope of the present invention. For example, although the preferred embodiment comprises a fully automated control and monitoring system, detailed further herein, many aspects of the present invention may be appreciated without full implementation of such a system. In one such alternative embodiment, the cleaning operation may be manually controlled wherein the flow-control valves 64, 65, 66 are manually opened and closed. In any case, it is critical only that the pressurized flows from the three sources 61, 62, 63 be selectively controllable through some means.

While the depiction of FIG. 2 indicates that the check valve 70 between the automated cleaning system 14 and the sanitary connection assembly 11 may be placed within the tubing or hosing 71 running between the automated cleaning system 14 and the flushing inlet 42, it is to be understood that this valve 70 may preferably be situated elsewhere. As will be better understood further herein, a positive pressure exists within the second cavity portion 25 of the cavernous body 22 during operation of the aseptic product dispensing system 10. As a result, placement of the check valve 70 within flushing inlet 42 would serve to virtually eliminate any possibility of contamination in the event of a hose failure or inadvertent disconnection during use. Upon complete review of the present teachings, however, these and other options for placement of such safety features, including the placement of redundant components, will be appreciated by those of ordinary skill in the art.

An integrated microprocessor based controller 72 of conventional implementation, as well known to those of ordinary skill in the art, is provided for operative control of the valves of the sanitary connection assembly 11 and automated cleaning system 14. Although the complete operation of the controller 72 will be better understood further herein, the controller 72 generally interfaces with a plurality of sensors or transducers and a plurality of valve controllers to detect the presence or absence of product 21 in the various stages of the aseptic product dispensing system 10 and to monitor the valve positions and component connections. The controller 72 then controls the valve positions and fluid flows in response to the sensed or monitored inputs.

Referring now more particularly to FIG. 1, the placement of the sanitary connection assembly 11 within the aseptic product dispensing system 10 is detailed. Although the aseptic product source 12 is substantially conventional, the source 12 is modified for the present invention to comprise an elongate, compressible product hose 39 terminating in the specially adapted hose connector 23 as previously described. The aseptic product dispensing system 10 comprises a pump 73 for forcing product 21 from the product package 51 through the hose connector 23 and into the sanitary connection system 11 and freeze chamber 27 of the product dispenser 13. As the conventionally known aseptic products 12 are typically provided with a flexible packaging 51, means 74 for applying pressure directly to the packaging 51 is also preferred.

According to the preferred embodiment, the pump 73 is a peristaltic pump, which, as shown, gently squeezes the product 21 through the product hose 39 without emulsification or other agitation. Additionally, the peristaltic pump 73 provides a type of check valve, wherein flow is strictly limited to one direction. Those of ordinary skill in the art will, of course, recognize that other pumps may be substituted. For example, a pneumatically operated double-diaphragm pump or even a centrifugal pump could be used.

Finally, a pinch shut-off valve 75 is provided for connection about the product hose 39 prior to connection of the hose connector 23 to the sanitary connection assembly 11. This provides an extra measure of security against inadvertent contamination in the unlikely event that the check valve 55 within the hose connector 23 should be defective or for some reason fail to properly operate. As will be apparent to those of ordinary skill in the art, the shut-off valve 75 as well as the pump 73 must be adapted to allow insertion of the product hose 39 with the hose connector 23 in place. The necessary modifications to the readily available components are, however, well within the reach of one of ordinary skill in the art.

As shown in the Figure, the aseptic product dispensing system 10 also comprises an automated engagement and connection system 76 for securing the hose connector 23 to the cavernous body 22. In particular, the cavernous body 22 is placed upon slide rails 77 or other substantially equivalent means for effecting a controlled longitudinal translation. In use, the hose connector 23 is snapped laterally into slots, which according to the preferred embodiment conform to the ferrule 53 of the hose connector, whereafter the cavernous body 22 is longitudinally translated to force engagement of the receptacle 37 with the hose connector 23. As depicted, a pressurized air source 78 may be utilized to effect the longitudinal translation of the cavernous body 22.

Those of ordinary skill in the art, however, will recognize many alternative embodiments for the engagement of the hose connector 23 and cavernous body 22 for the secure formation of the sanitary connection assembly 11. For example, simple friction fit connection or manual connection with snaps, brackets or other connectors may be implemented. The automated system 76 described is presently preferred, however, notwithstanding the greater complexity, as it provides opportunity for electronic feedback of the connection status and serves to ensure a very secure connection 23 of the hose connector to the cavernous body 22.

Those of ordinary skill in the art will also recognize that many alternative embodiments may be formulated for the automated engagement system 76. For example, but not by way of limitation, the cavernous body 22 may be translated by a solenoid, on a worm gear or by a rack and pinion system. Likewise, the cavernous body 22 may be maintained in place while the hose connector 23 is longitudinally translated into secure engagement with the receptacle 37. In any case, all such implementations should be within the reach of those of ordinary skill in the art upon review of the teachings herein.

The product dispenser 13 is substantially similar to that well known to those of ordinary skill in the art. In the preferred embodiment, however, the product dispenser 13 is isolated from the sanitary connection assembly 11 through a check valve 79, thereby further ensuring the aseptic integrity of the system 10. A vent 80, comprising therein a selectively actuatable valve, is also provided to allow the one-way escape of air or other gas during the filling of the product dispenser 13. Various controls and indicators are preferably located on the front panel 81 of the dispenser 13, the function of which will be apparent upon review of the following discussions detailing the preferred operation of the aseptic product dispensing system 10.

Figure 4:
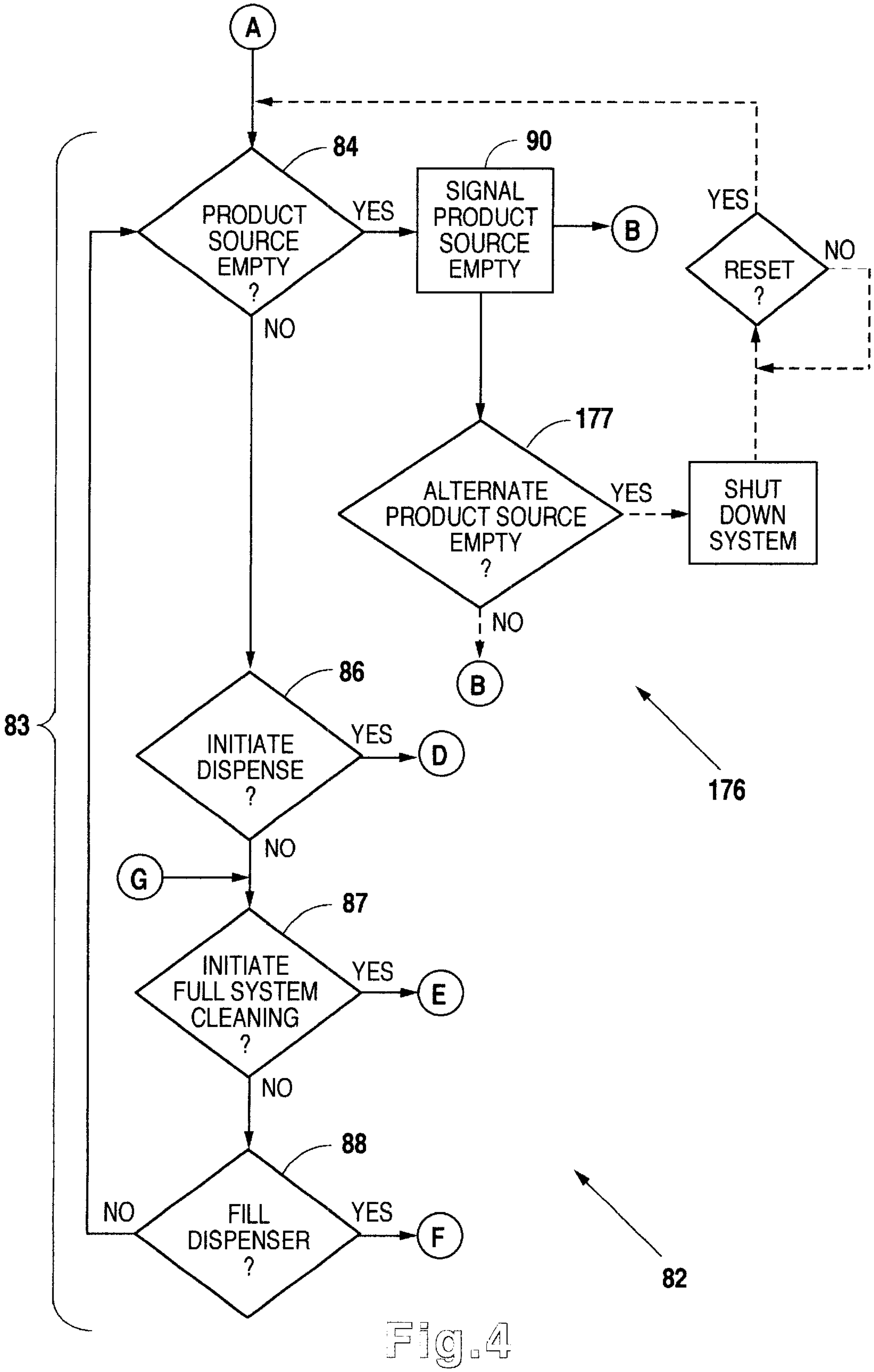
FIG. 4 shows, in flow chart, the preferred embodiment of the general control scheme of the aseptic product dispensing system.

Referring now to FIG. 4, the general control scheme 82 for the preferred embodiment is now detailed. Upon start up, the controller 72 enters an interrupt style control loop 83 wherein the quantity status of the product source is monitored and dispensing, cleaning and filling operations may be initiated. Although those of ordinary skill in the art will recognize the existence of virtually endless implementations for such a control scheme 82, or a substantial equivalent thereof, the presently preferred embodiment in particular begins the loop 83 by ascertaining whether the product source has been depleted 84. This may be done, for example, by polling a sensor 85 in the line from the sanitary connection assembly 11 to the product dispenser 13 or, equivalently, in another appropriate part of the aseptic product dispensing system 10. So long as no user input has been given and the product 21 supply remains positive, the controller 72 simply loops through the overall scheme 82 checking in turn for a user input to initiate the product dispensing operation 86, a timing trigger (or user input) to initiate a full system cleaning operation 87 or a sensed product low condition (or user input) to initiate a dispenser filling operation 88. The loop then repeats.

Figure 5:
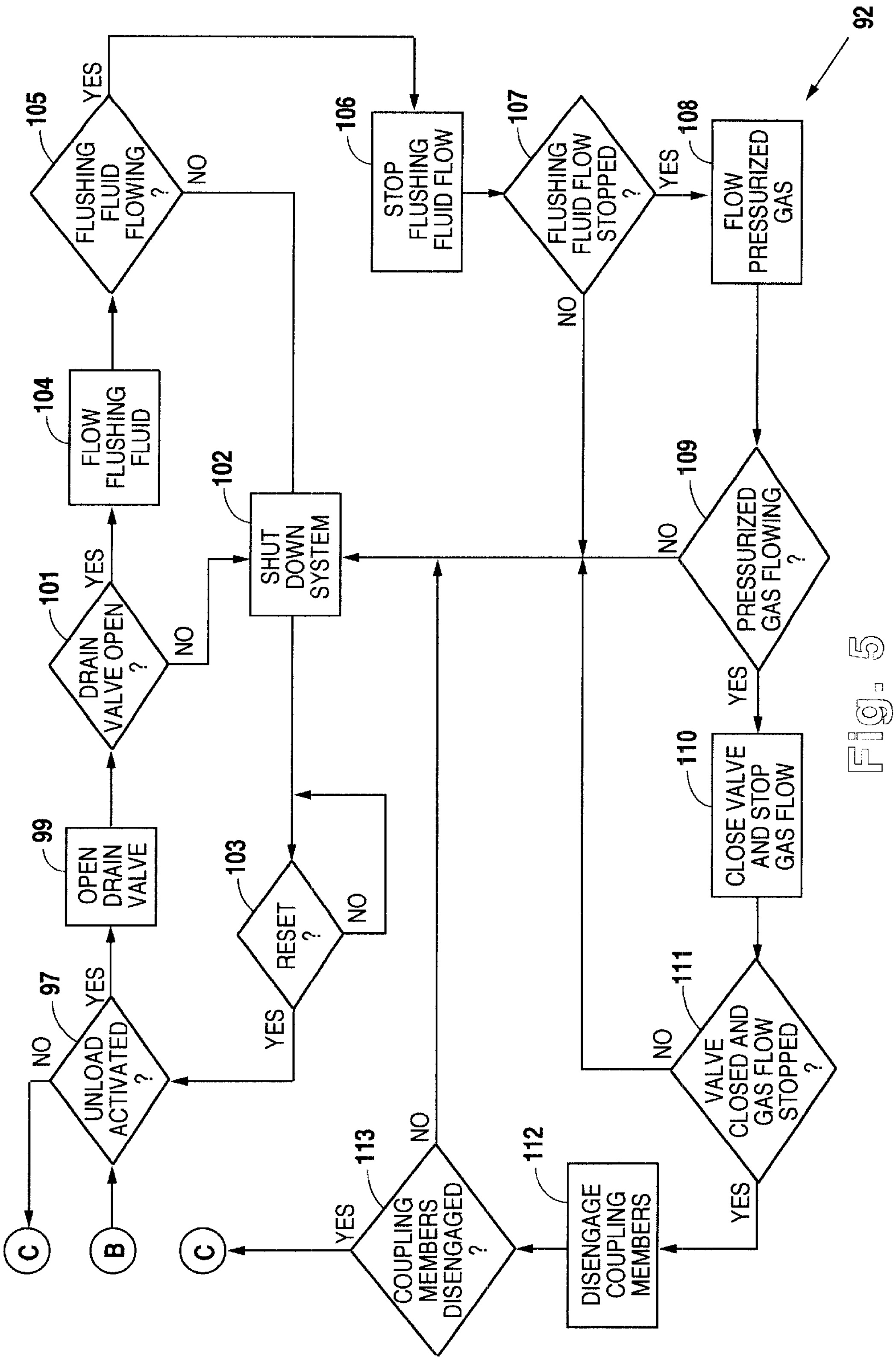
FIG. 5 shows, in flow chart, the product unload routine corresponding to the general control scheme of FIG. 4.
Figure 7:
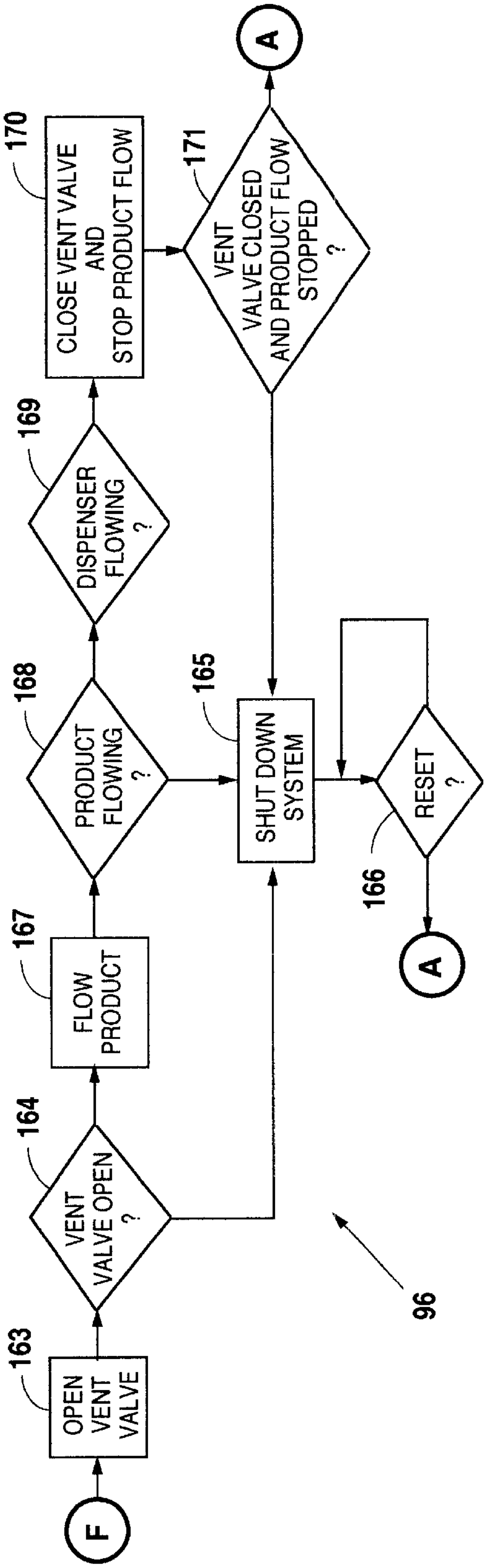
FIG. 7 shows, in flow chart, the dispenser fill routine corresponding to the general control scheme of FIG. 4.
Figure 8:
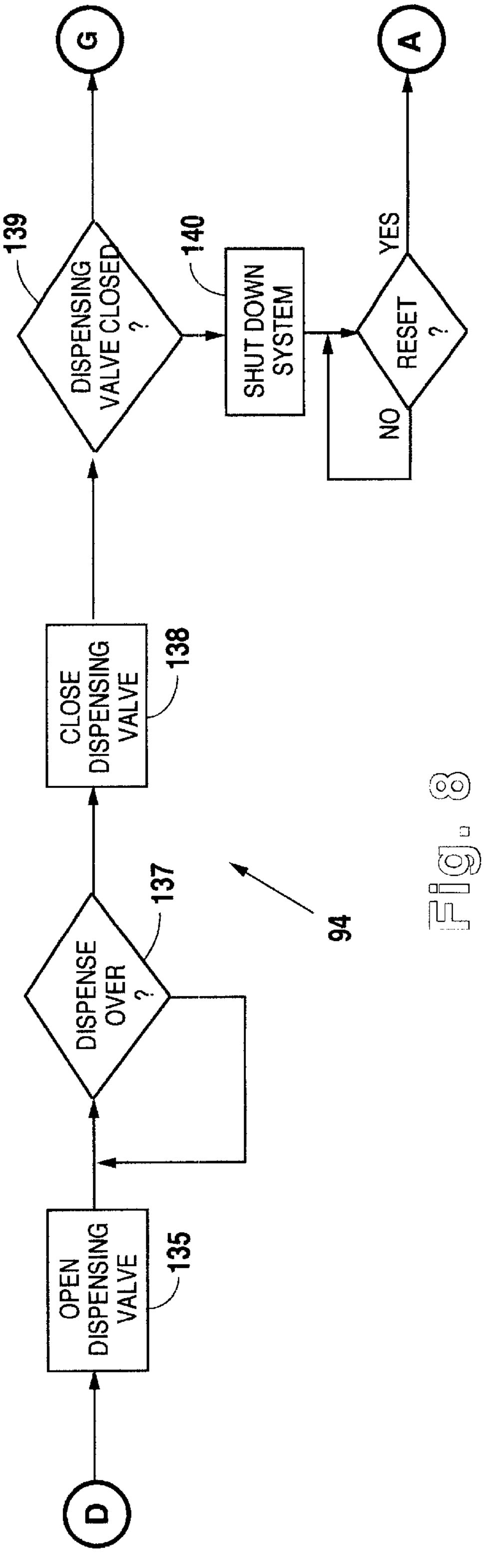
FIG. 8 shows, in flow chart, the product dispense routine corresponding to the general control scheme of FIG. 4.
Figure 9:
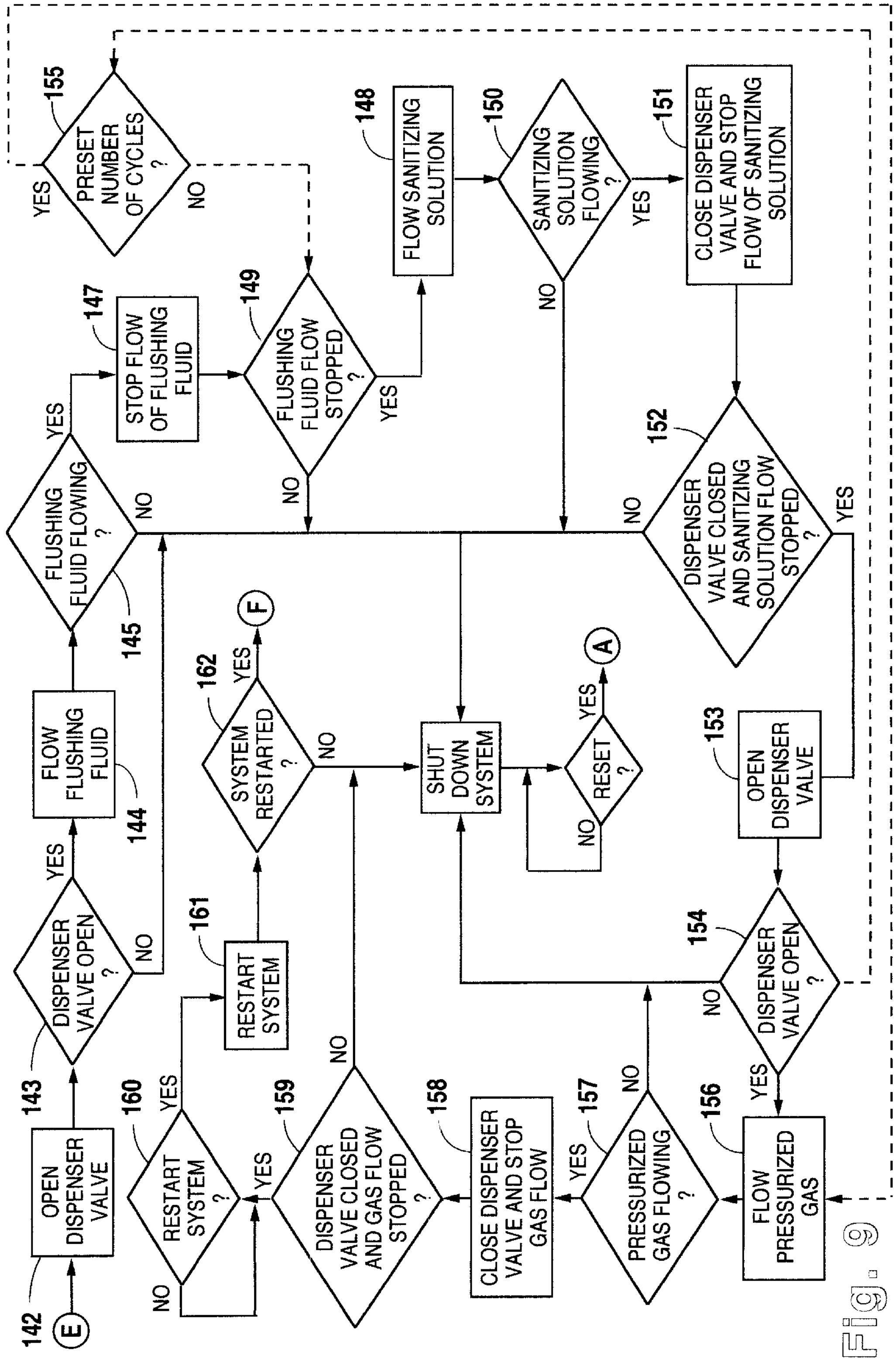
FIG. 9 shows, in flow chart, the full system cleaning and sanitizing routine corresponding to the general control scheme of FIG. 4.

In the event that the product 21 supply becomes depleted or a user input directs the initiation of some operation, the loop 83 is interrupted for completion of an appropriate course of action. For example, if the product 21 source becomes depleted the controller 72 signals 90 the empty state through the dispensing system's warning system 91 and then begins the product unload routine 92, as depicted in FIG. 5 and detailed further herein. Likewise, in the event that a user input is detected for initiation of one of the system's other operations the loop 83 is interrupted for completion of that operation. In particular, if the user wishes to dispense product 21 the user's desire will be communicated through the dispenser actuator 93, comprising an electronic switch therein, and detected by the control loop as the loop 83 polls for the initiation of a product dispense operation 86. Upon detection of this state, the controller begins the dispense operation 94, as depicted in FIG. 8 and detailed further herein. When the controller 72 detects that the predetermined time for cleaning has arrived (or that the user wishes to initiate a full system cleaning operation), a signal is detected by the control loop 83 and the full system sanitizing routine 95 is initiated, as depicted in FIG. 9 and detailed further herein. Finally, communication from an appropriate sensor that the product level is low (or receipt of a signal indicating the user's desire to fill the dispenser) initiates the dispenser fill routine 96, as depicted in FIG. 7 and detailed further herein. Each of these operations 92, 94, 95, 96 is now detailed in turn.

Referring now to FIG. 5 in particular, the product unload routine 92 of the preferred embodiment is now detailed. As depicted in the Figure, the routine 92 begins by determining 97 whether the user has indicated, preferably through activation of a push-button switch 98 at the system's front panel 82, a desire to unload the spent product packaging 51. If so, the controller 72 first directs 99 the opening of the pinch shut-off valve 46 in the drain hose 100 from the drain port 43 of the sanitary connection assembly 11. In order to prevent damage to the system's check valves 55 or the creation of forced back flows therethrough and the resulting possibility of contamination, the controller 72 then checks 101 to ensure that the pinch shut-off valve 46 is open. If not, the entire dispensing system 10 is shut down 102, preferably alerting the user to the trouble via the warning system 91. A service technician then corrects the malfunction and resets 103 the aseptic product dispensing system 10, whereafter the process 92 resumes with a determination 97 of whether the user still desires to unload the spent product 51. Provided the shut-off valve 46 did open, however, the controller 72 goes on to perform a flushing sequence prior to disengagement of the hose connector 23 from the cavernous body 22.

By opening the appropriate flow-control valves 65, 66, pressurized sanitizing solution 17 and/or pressurized flushing fluid 16 are flowed 104 through the flushing inlet 42 into the annular flushing cavity 89 and central product aperture 38 and then evacuated through the drain port 43 to the drain hose 100. Upon initiation 104 of the fluid flow, the system 72 preferably makes a check 105 to verify actual flow, utilizing sensors or the like known to those of ordinary skill in the art, thereby ensuring that the receptacle 37 and hose connector 23 regions of the sanitary connection assembly 11 will be cleansed of product 21 prior to disengagement. In the event that fluid 16, 17 is not flowing, the system shuts down 102 as previously described and preferably alerts the user to the trouble via the warning system 91. Assuming the flushing fluid 16, 17 is actually flowing, however, the controller 72 then terminates 106 flow of the flushing fluid 16, 17, preferably after lapse of some predetermined time, by closing those flow-control valves 65, 66 previously opened. The controller 72 checks 107 to ensure that the flushing fluid 16, 17 has stopped, again going through a shut down 102 if not, and then by opening the appropriate flow-control valve 64 initiates 108 flow of pressurized gas 15 for evacuation of the flushing fluid 16, 17 from the sanitary connection assembly 11. The controller 72 checks 109 to ensure that gas 15 is actually flowing, again by use of sensors well known to those of ordinary skill in the art, and then, after a predetermined delay, substantially simultaneously terminates 110 flow of the pressurized gas by closing the previously opened flow-control valve 64 and closes the pinch shut-off valve 46 in about the drain hose 100. As a final check, the controller 72 polls 111 an appropriate sensor to ensure the gas flow has stopped and the pinch shut-off valve 46 has closed. Assuming as much, the flushing operation terminates.

Upon termination of the flushing operation, the automated engagement and connection system 76 disengages 112 the hose connector 23 from the receptacle 37 of the sanitary connection system 11. A check 113 is performed to ensure that the hose connector 23 and receptacle 37 did disengage, whereafter the hose connector 23 is free for removal from the sanitary connection assembly 11. The user, who is preferably notified of this status via an indicator on the front panel 81 of the product dispenser 13, is then able to remove the product hose 39 from the pinch shut-off valve 75 and the peristaltic pump 73 and the aseptic product package 51 from its container 114. The product unload routine 92 then terminates, the controller 72 looking next to an input indicating the user's desire to load a new aseptic product package 51 into the aseptic product dispensing system 10.

Figure 6:
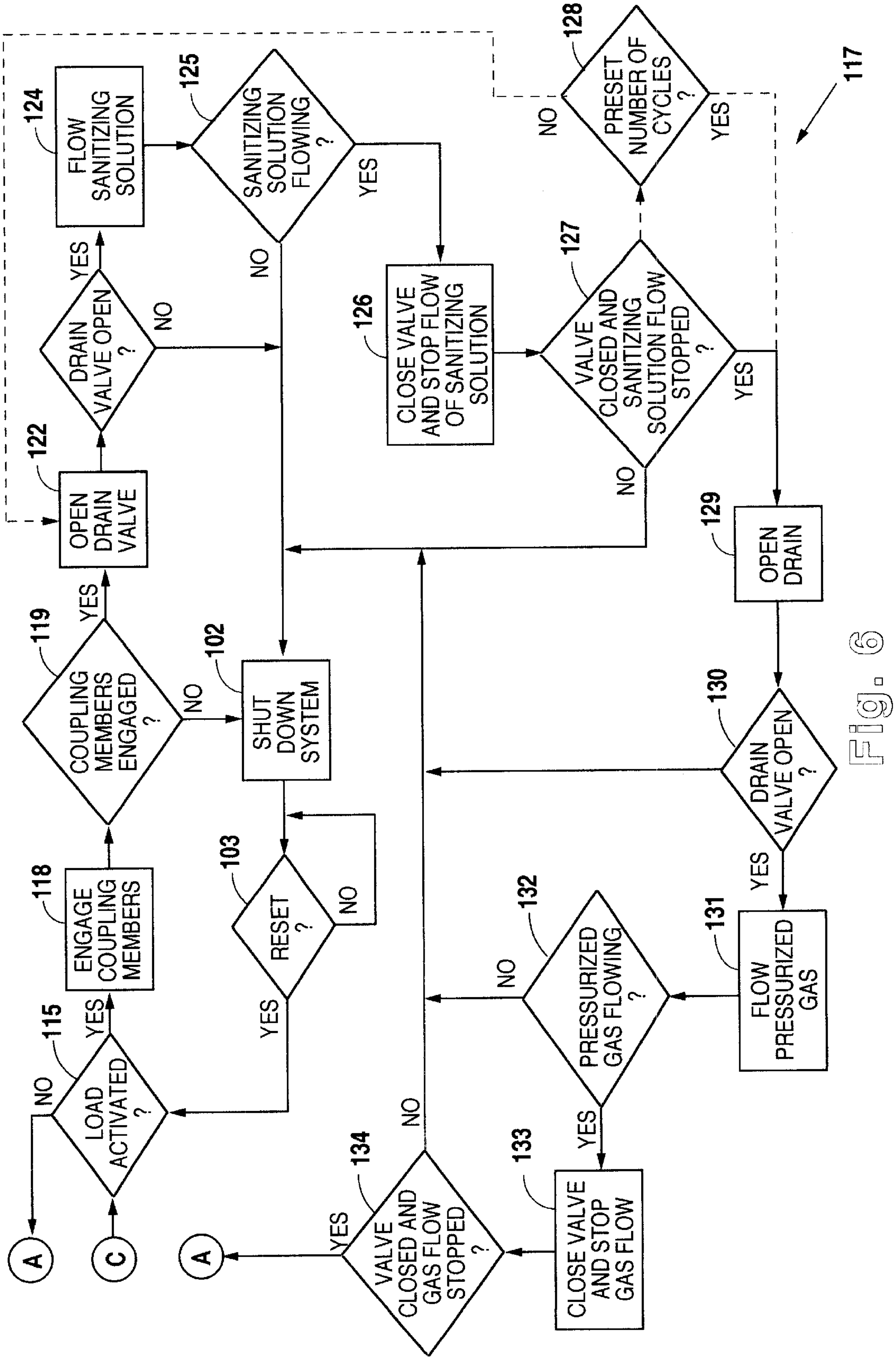
FIG. 6 shows, in flow chart, the product load routine corresponding to the general control scheme of FIG. 4.

At this point, see FIG. 6, the controller 72 will poll 115 the load switch 116 on the product dispenser's front panel 81 but, because the user has not had enough time to place a new product package 51 and product hose 39 into the aseptic product dispensing system 10, will probably not find a load indication. At this point, the control loop 83 depicted in FIG. 4 will resume, continuing to signal 90 that the product source 12 is empty and giving the user the opportunity to place a new aseptic product package 51 into the container 114 and to feed the product hose 39 through the peristaltic pump 73 and pinch shut-off valve 75. After the user places the new hose connector 23 into the provided slots and presses the load button 116 on the front panel 81 of the product dispenser 13, the controller 72 detects 115 the load activated indication and continues with the product load routine 117, as depicted in FIG. 6.

Referring now to FIG. 6, when the controller 72 detects 115 a load activated indication the automated engagement and connection system 76 engages 118 the receptacle 37 of the sanitary connection assembly 11 into the new hose connector 23. A check 119 is then made to ensure that a secure engagement has taken place. If not, the aseptic product dispensing system 10 is shut down 120, preferably alerting the user to the trouble via the warning system 91. A service technician then corrects the malfunction and reset 121 the aseptic product dispensing system 10, whereafter the controller 72 looks again 115 for an indication that the user desires to run the product load routine 117. Assuming that a secure engagement has taken place, however, the controller 72 next executes an automated cleaning and sanitizing of the sanitary connection assembly 11.

As also shown in FIG. 6, the automated cleaning routine begins with the controller 72 opening 122 the pinch shut-off valve 46 in the drain hose 100 from the drain port 43 of the sanitary connection assembly 1. As with the product unload routine 92, a check 123 is made to ensure that the pinch shut-off valve 46 is open prior to flowing 124 pressurized sanitizing fluid 17. Assuming that the pinch shut-off valve 46 did properly open, the controller 72 then initiates 124 the flow of pressurized sanitizing fluid 17 by actuating the flow-control valve 65 interposed in the line between the sanitizing fluid source 61 and the flushing inlet 42 of the sanitary connection assembly 11. Again, a check 125 is made to ensure actual flow of pressurized sanitizing fluid 17.

Sanitizing fluid 17 then enters the annular flushing cavity 89 and central product aperture 38 through the flushing inlet 42. Because the flushing fluid 17 is preferably under fair pressure, it fully floods the second cavity portion 25 of the sanitary connection assembly 11 killing and/or removing any contaminants as may have entered during the product change. After a predetermined time, the pinch shut-off valve 46 and the flow-control valve 65 are substantially simultaneously controlled 126 to close the drain port 42 and stop the flow of sanitizing fluid 17, thereby entering a soaking cycle. As before, a check 127 is performed to ensure the valves 46, 65 did in fact operate as desired. After another predetermined delay, the drain port 42 is again opened 129 to allow evacuation of the sanitizing solution 17 although, in an alternative embodiment, a preset number of flushing and soaking cycles 128 may be desired prior to evacuation of the chamber 25.

After checking 130 to ensure that the drain port 42 is properly open, the controller 72 flows pressurized gas 15 into the second cavity 25 by actuating 131 the flow-control valve 64 interposed in the line between the gas source 63 and the flushing inlet 42. Checking 132 first to ensure proper valve 64 positioning, the controller 72 then allows the pressurized gas 15 to flow for a desired time period. The drain port 42 is then closed 133 simultaneously with the cessation of gas flow and valve positions are checked 134, concluding the product load routine 117. The controller 72 then returns to the control loop 83 depicted in FIG. 4.

As the controller 72 polls the various switches on the front panel 81 of the product dispenser 13, one indication as may be determined is the user's desire to dispense product 21. Upon detection of this indication, the controller 72 interrupts the control loop 83 to execute the product dispense routine 94, as depicted in FIG. 8. This routine 94 begins with the opening 135 of the product dispensing valve 136. The valve 136 remains open so long as the user maintains a desire 137 to dispense product 21; whereafter the product dispensing valve 136 is closed 138. Prior to returning to the control loop 83 of FIG. 4, a check 139 is made to ensure that the dispensing valve 136 did close. If not, the aseptic product dispensing system 10 shuts down 140 as previously described, preferably alerting the user to the trouble via the warning system 91. If so, however, the dispensing routine 94 terminates and the control loop 83 resumes.

Another indication as may be polled by the control loop 83 is the arrival of the predetermined time for full cleaning of the aseptic product dispensing system 10 (or the user's desire to initiate a full system cleaning) 87. In the full system cleaning or sanitizing routine 95, as depicted in FIG. 9, the automated cleaning system 14 is utilized to sanitize not only the sanitary connection assembly 11 but also the product dispenser 13. The user may elect to perform this operation at any time, but, to ensure minimal product 21 waste, it is preferred that the user perform this operation only after receiving an indication that the product dispenser 13 is empty. The full system cleaning routine 95 will also preferably always be performed after a predetermined safety time has elapsed or upon the arrival of a predetermined hour.

The sanitizing routine 95 begins by opening 142 the product dispensing valve 136 on the front of the product dispenser 13. It should be noted that while manually operated valves are typically utilized for product dispensing, it is preferred that an automated, electrical type valve be used in order to better interface with the automated cleaning feature now described. In any case, after checking 143 to ensure that the product dispensing valve 136 did properly open the controller 72 initiates 144 the flow of pressurized flushing fluid 16 by actuating the appropriate flow-control valve 66 in the line between the flushing fluid source 62 and the flushing inlet 42. As in the previously described operations, a check 145 is made to ensure actual flow of pressurized flushing fluid 16.

Although those of ordinary skill in the art will recognize that the controller 72 could then open the product flow-control valve 20 between the first 24 and second 25 cavities of the sanitary connection assembly 11, the preferred embodiment utilizes the pressure of the flushing 16 or sanitizing 17 solution to push the valve 20 against the biasing spring 35 and off its seat 146, thereby allowing flow from the second cavity 25 to the first cavity 24. In this manner, the possibility for back flow to the second cavity 25 of any contaminant as may be present in the first cavity 24 is greatly reduced. Those of ordinary skill in the art will recognize, therefore, that it is necessary to design the valves 20, 46 of the system such that the product flow-control valve 20 is displaced by the pressure of the automated cleaning system 14 when and only when the drain port 43 is closed.

After a predetermined time, the flow of pressurized flushing fluid 16 is terminated 147 and a flow of pressurized sanitizing fluid 17 is established 148 in its place. As with each previous step in the control scheme 82, a check 149, 150 is performed after each valve operation to ensure the desired state is achieved. After another predetermined time has elapsed, the flow of sanitizing fluid 17 is stopped 151 simultaneously with the closing of the product dispensing valve 136, the controller 72 again polling 152 the appropriate sensors to ensure the desired valve states. As was the case in the product load routine 117 of FIG. 6, the simultaneous valve closings 151 serve to establish a soak cycle for the product dispenser 13. At the timed conclusion of this soak cycle, the dispenser valve 136 is opened 153 and checked 154. Similar to the product load routine 117, those of ordinary skill in the art will recognize that in at least an alternative embodiment the controller 72 may be programmed to repeat 155 the flow of sanitizing solution 17 until a preset number of cycles has been achieved. In any case, after the one or more desired soak cycles, the controller 72 flows 156 pressurized gas 15 into the sanitary connection assembly 11 and product dispenser 13 and checks 157 to ensure proper gas flow. After the pressurized gas 15 displaces the flushing fluid 16 and/or sanitizing solution 17 through the product dispensing valve 136 the controller 72 substantially simultaneously closes 158 the product dispenser valve 136 and stops the pressurized gas flow, checking 159 the appropriate valves and lines to ensure both.

The aseptic product dispensing system 10 now stands ready for filling, completely cleaned and sanitized and with a positive internal gas pressure serving to prevent the inadvertent introduction of contaminants. At this point, the controller 72 repeatedly polls 160 the appropriate switch on the front panel 81 of the product dispenser 13 to determine whether the user desires to restart the system. If so, the system 10 is restarted 161 without necessity for software or hardware initialization. Provided that the system 10 properly restarts 162, the product fill routine 96 as depicted in FIG. 7 is then executed. Of course, those of ordinary skill in the art will recognize that instead of restarting 161 the system the user may decide at this point to power off the aseptic product dispensing system 10. In the preferred embodiment, however, the aseptic product dispensing system 10 will automatically restart 161 at the arrival of a predetermined hour such as, for example, just before store opening time.

The dispenser fill routine 92, depicted in FIG. 7, is generally entered either directly following a system restart 161 at the termination of the full system sanitizing routine 95, at the arrival of a predetermined time or upon receipt of a user input. In any case, the product fill routine 92 begins with the controller's opening 163 of the vent valve 80 on the product dispenser 13. As with all previous valve operations, the controller 72 performs a check 164 to determine that the vent valve 80 did open, thereby ensuring a channel for the displacement of the gas 15 within the product dispenser 13 by the introduced product 21. As with each previous routine, a negative indication at any valve or flow check is responded to by a system shut down 165 and notification through the warning system 91. A service technician then corrects the malfunction and resets 166 the aseptic product dispensing system 10.

In order to fill the product dispenser 13, the controller 72 then activates 167 the peristaltic pump 73 to move product 21 from the aseptic product source 12, past the check valve 58 in the hose connector 23 and into the second cavity 25 of the sanitary connection assembly 11. At this point the pressure of the product 21 will build to the point of displacing the product flow-control valve 20 against the biasing spring 35 and off its seat 146, thereby allowing flow from the second cavity 25 to the first cavity 24. A check 168 is made to ensure that product 21 is flowing from the sanitary connection assembly 11 into the product dispenser 13 or a freeze chamber 27 therein, whereafter flow is allowed to continue until the desired level is reached. Upon reaching the desired product level 169, the product flow is terminated 170 substantially simultaneously with the closing of the vent valve 80. Upon checking 171 to ensure the flow has been terminated and the vent valve 80 has been closed, the dispenser fill routine 96 terminates by returning to the control loop 83 of FIG. 4.

While the foregoing description is exemplary of the preferred embodiment of the present invention, those of ordinary skill in the relevant arts will recognize the many variations, alterations, modifications, substitutions and the like as are readily possible, especially in light of this description and the accompanying drawings. For example, those of ordinary skill in the art will recognize that virtually unlimited control schemes 82 may be implemented to carry out the concepts of the present invention. Likewise, those of ordinary skill in the art will also recognize that virtually unlimited combinations of various valves, lines and sensors may be utilized to embody the present invention. Finally, those of ordinary skill in the art will recognize that the present invention may be carried out substantially as described or may be implemented with redundancy in its various parts.

Figure 3:
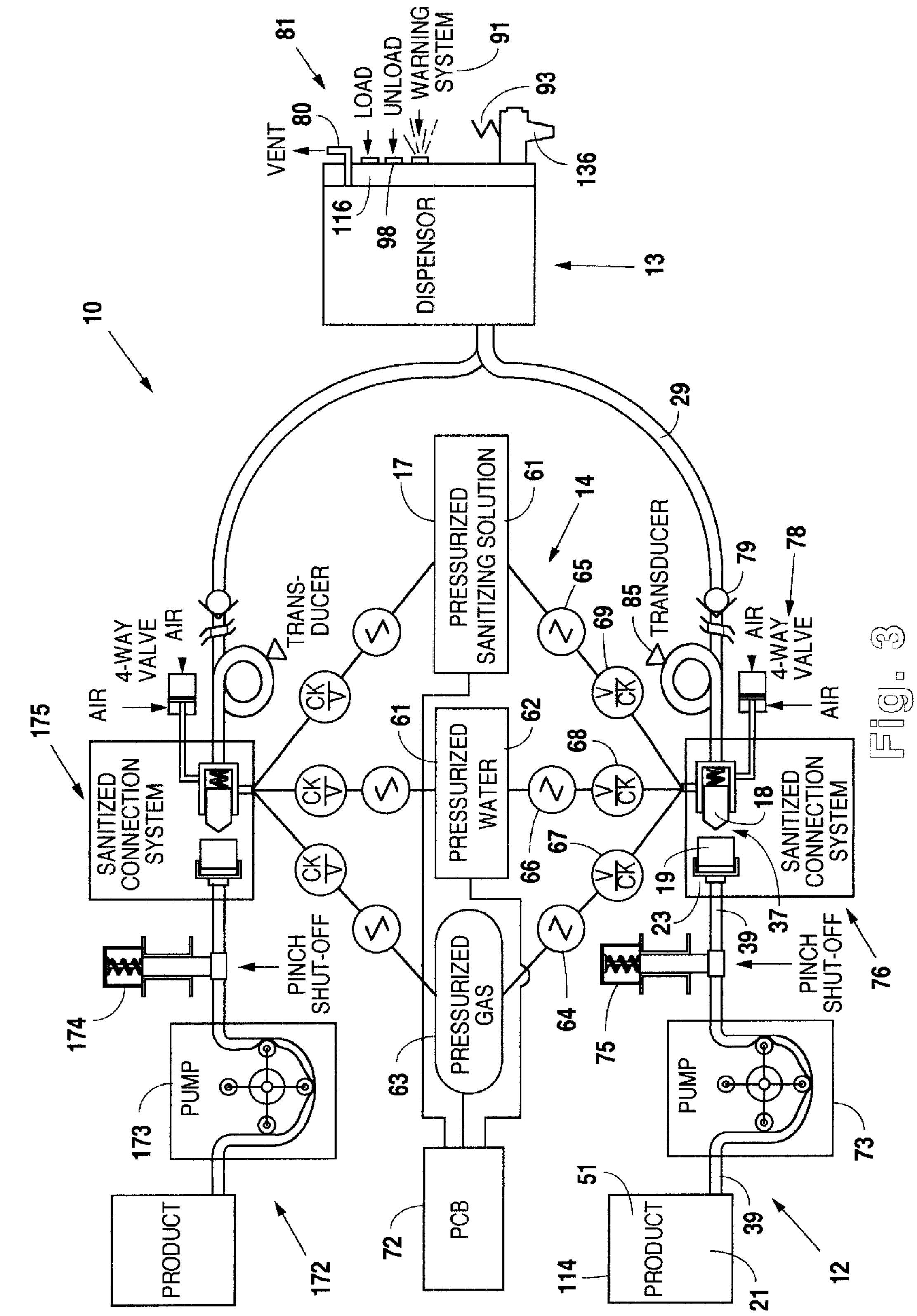
FIG. 3 shows, in schematic block diagram, an alternative embodiment of the product dispensing system of FIG. 1, wherein certain components are redundantly provided.

For example, as shown in FIG. 3, the aseptic product dispensing system 10 may be implemented with a redundant product source 172, peristaltic pump 173, shut-off valve 174 and sanitary connection assembly 175. As depicted 176 in the dashed lines of FIG. 4, this alternative embodiment may be utilized as a secondary product source for filling a single chamber of the product dispenser. In this case, the product sources may be consumed alternatively 177, thereby making product substantially continuously available so long as the user changes the empty source while the full source is in use.

In yet another alternative, the duplicated portions 172, 173, 174, 175 of the system may be provided for purposes of variety only. In this case, the aseptic product dispensing system 10 shares some resources, such as the pressurized fluids 16, 17 and gases 15 and the controller hardware 72, while providing separate product sources 12, 172 for supply of separate chambers in the product dispenser 13. In any case, because the scope of the present invention is much broader than any particular embodiment, the foregoing detailed description should not be construed as a limitation of the scope of the present invention, which is limited only by the claims drawn hereto.

What is claimed is:

1. A sanitary connection assembly for providing substantially aseptic fluid communication between an aseptic product source and a conventional product dispenser, said sanitary connection assembly comprising:

- a body having a first cavity portion and a second cavity portion interior thereto;
- a flushing inlet for providing fluid communication of a cleaning fluid to said second cavity portion;
- a drain port from said second cavity portion for evacuation of the cleaning fluid from said second cavity portion;
- an outlet from said first cavity portion for interfacing with a product dispenser;
- a flow port into said first cavity portion from the second cavity portion; and
- a valve for regulating product flow trough said flow port from said second cavity portion to within said first cavity portion, whereby said valve prevents cleaning fluid from entering said first cavity portion.

2. The sanitary connection assembly as recited in claim 1, wherein said body is further adapted for flushing of said first cavity portion.

3. The sanitary connection assembly as recited in claim 2, wherein said body is further adapted for flushing of said first cavity portion substantially simultaneously with said second cavity portion.

4. The sanitary connection assembly as recited in claim 2, wherein said body is further adapted for flushing of said second cavity portion independently of said first cavity portion.

5. The sanitary connection assembly as recited in claim 1, said sanitary connection assembly further comprising a source of cleaning fluid in selective fluid communication, through said flushing inlet, with said second cavity portion.

6. The sanitary connection assembly as recited in claim 5, wherein said cleaning fluid comprises a sanitizing solution.

7. The sanitary connection assembly as recited in claim 5, said sanitary connection assembly further comprising a source of flushing fluid in selective fluid communication, through said flushing inlet, with said second cavity portion.

8. The sanitary connection assembly as recited in claim 7, wherein said flushing fluid comprises water.

9. The sanitary connection assembly as recited in claims 7, said sanitary connection assembly further comprising an automated cleaning system.

10. The sanitary connection assembly as recited in claim 9, wherein said automated cleaning system comprises a first flow control valve for controlling fluid communication of said cleaning fluid from said source of cleaning fluid to said second cavity portion.

11. The sanitary connection assembly as recited in claim 10, wherein said automated cleaning system further comprises a second flow control valve for controlling fluid communication of said flushing fluid from said source of flushing fluid to said second cavity portion.

12. The sanitary connection assembly as recited in claim 11, wherein:

said cleaning fluid is pressurized at said source of cleaning fluid; and said flushing fluid is pressurized at said source of flushing fluid.

13. The sanitary connection assembly as recited in claim 9, wherein said automated cleaning system comprises a controller, said controller being adapted to selectively admit said cleaning fluid and said flushing fluid to said flushing inlet.

14. The sanitary connection assembly as recited in claim 13, wherein said controller is further adapted to selectively admit said cleaning fluid and said flushing fluid to said flushing inlet at a first pressure and at a second pressure, said second pressure being greater than said first pressure.

15. The sanitary connection assembly as recited in claim 14, wherein said valve is biased against said flow port, thereby normally closing said flow port between said first chamber and said second chamber.

16. The sanitary connection assembly as recited in claim 15, wherein:

said first pressure is insufficient to dislodge said valve from said flow port; and said second pressure is sufficient to dislodge said valve from said flow port, thereby enabling flow through said flow port from said second chamber toward said first chamber.

17. The sanitary connection assembly as recited in claim 7, wherein said second cavity portion comprises a cannular projection from said flow port.

18. The sanitary connection assembly as recited in claim 17, wherein said cannular projection is adapted to pierce a protective covering over a hose connector.

19. The sanitary connection assembly as recited in claim 17, wherein said second cavity portion further comprises an annular flushing cavity about said cannular projection.

20. The sanitary connection assembly as recited in claim 19, wherein said flushing inlet terminates into said flushing cavity.

21. The sanitary connection assembly as recited in claim 20, wherein said cannular projection comprises a central product aperture to said flow port.

22. The sanitary connection assembly as recited in claim 21, wherein said drain port projects into said central product aperture substantially adjacent to said flow port.

23. The sanitary connection assembly as recited in claim 22, said sanitary connection assembly further comprising:

a hose connector for joining a product hose to said body; and wherein said hose connector cooperates with said body to form said second cavity portion.

24. The sanitary connection assembly as recited in claim 23, wherein said annular flushing cavity is arranged to project fluids passed through said flushing inlet toward an interior face of said hose connector.

25. The sanitary connection assembly as recited in claim 23, wherein said hose connector comprises a check valve, said check valve being arrange to substantially prevent passage of fluids from said second cavity into the product hose.

26. The sanitary connection assembly as recited in claim 7, said sanitary connection assembly further comprising a source of gas in selective fluid communication, through said flushing inlet, with said second cavity portion.

27. The sanitary connection assembly as recited in claim 26, wherein said gas comprises carbon dioxide.

28. The sanitary connection assembly as recited in claim 27, wherein said gas consists essentially of carbon dioxide.

29. The sanitary connection assembly as recited in claim 7, said sanitary connection assembly further comprising a check valve, said check valve being arranged to prevent fluid flow from said second cavity portion to said sources.

30. The sanitary connection assembly as recited in claim 29, wherein said check valve is integral with said flushing inlet.

31. The sanitary connection assembly as recited in claim 7, said sanitary connection assembly comprising a plurality of check valves, each said check valve being associated with one of said sources and arranged to prevent fluid flow toward the associated said source.

* * * * *